(12) United States Patent
Nakayama et al.

(10) Patent No.: US 9,312,683 B2
(45) Date of Patent: Apr. 12, 2016

(54) VEHICLE-MOUNTED ELECTRIC ROTATING MACHINE

(71) Applicant: DENSO CORPORATION, Kariya, Aichi-pref. (JP)

(72) Inventors: Hideaki Nakayama, Tokoname (JP); Harumi Horihata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 7 days.

(21) Appl. No.: 14/514,583

(22) Filed: Oct. 15, 2014

(65) Prior Publication Data

US 2015/0102782 A1 Apr. 16, 2015

(30) Foreign Application Priority Data

Oct. 16, 2013 (JP) ................................ 2013-215260

(51) Int. Cl.
| | | |
|---|---|---|
| *H02P 11/00* | (2006.01) | |
| *H02H 7/06* | (2006.01) | |
| *H02P 9/00* | (2006.01) | |
| *H02J 11/00* | (2006.01) | |
| *H02P 9/10* | (2006.01) | |
| *H02P 9/48* | (2006.01) | |
| *H02K 16/02* | (2006.01) | |

(52) U.S. Cl.
CPC ................ *H02H 7/067* (2013.01); *H02J 11/00* (2013.01); *H02P 9/10* (2013.01); *H02P 9/48* (2013.01)

(58) Field of Classification Search
USPC ............................ 322/21, 23, 28, 94; 310/114
See application file for complete search history.

(56) References Cited

U.S. PATENT DOCUMENTS

| | | | | |
|---|---|---|---|---|
| 4,788,486 | A * | 11/1988 | Mashino ............... | H02J 7/1423 307/16 |
| 5,245,267 | A * | 9/1993 | Pierret .................. | H02J 7/1423 320/119 |
| 5,444,355 | A * | 8/1995 | Kaneyuki ............... | H02K 19/34 322/58 |
| 5,502,368 | A * | 3/1996 | Syverson .............. | H02J 7/1438 310/181 |
| 5,631,544 | A * | 5/1997 | Syverson .............. | H02J 7/1438 322/46 |
| 5,656,922 | A * | 8/1997 | LaVelle .................. | B60L 11/12 310/181 |
| 5,693,995 | A * | 12/1997 | Syverson ............. | H02K 1/2773 310/114 |
| 5,710,471 | A * | 1/1998 | Syverson .............. | H02J 7/1438 310/114 |
| 5,747,909 | A * | 5/1998 | Syverson ................. | H02K 1/24 310/114 |

(Continued)

FOREIGN PATENT DOCUMENTS

JP H09-219938 8/1997

*Primary Examiner* — Pedro J Cuevas
(74) *Attorney, Agent, or Firm* — Nixon & Vanderhye P.C.

(57) ABSTRACT

A vehicle-mounted electric rotating machine includes a field winding wound on a rotor for magnetizing a field pole of the rotor, a stator winding for generating an AC voltage in accordance with a rotating magnetic field generated by the field pole, a power converter for converting the AC voltage to a DC voltage and outputting the DC voltage through a first power supply line connected to an output terminal thereof, and a load dump handling section for performing a load dump protection operation when a voltage of the output terminal of the power converter exceeds a threshold voltage. The load dump handling section is supplied with operating power through a second power supply line provided separately from the first power supply line.

7 Claims, 7 Drawing Sheets

(56) References Cited

U.S. PATENT DOCUMENTS

| | | | | |
|---|---|---|---|---|
| 5,748,463 | A | 5/1998 | Tsutsui et al. | |
| 5,753,989 | A * | 5/1998 | Syverson | B60L 11/12 310/114 |
| 6,236,134 | B1 * | 5/2001 | Syverson | H02K 1/2773 310/156.53 |
| 6,545,884 | B2 * | 4/2003 | Curtiss | G05F 1/613 363/37 |
| 7,471,004 | B2 * | 12/2008 | Kanazawa | H02J 7/1492 290/40 B |
| 8,513,924 | B2 * | 8/2013 | Horihata | H02P 9/30 322/20 |
| 8,525,491 | B2 * | 9/2013 | Iwai | H02P 9/48 322/27 |
| 8,541,988 | B2 * | 9/2013 | Horihata | H02J 7/1461 322/21 |
| 8,547,071 | B2 * | 10/2013 | Horihata | H02P 9/006 322/21 |
| 8,564,255 | B2 * | 10/2013 | Nakayama | H02M 7/53871 322/29 |
| 8,570,004 | B2 * | 10/2013 | Asada | H02J 7/1492 322/28 |
| 8,618,776 | B2 * | 12/2013 | Horihata | H02P 9/48 322/24 |
| 8,710,807 | B2 * | 4/2014 | Horihata | H02P 9/08 322/33 |
| 8,716,966 | B2 * | 5/2014 | Nakayama | H02P 27/08 290/12 |
| 8,716,983 | B2 * | 5/2014 | Horihata | H02P 9/48 322/23 |
| 8,896,275 | B2 * | 11/2014 | Horihata | H02J 7/1492 322/28 |
| 8,928,291 | B2 * | 1/2015 | Maruyama | H02P 9/102 322/23 |
| 9,160,251 | B2 * | 10/2015 | Horihata | H02M 7/53803 |
| 9,172,240 | B2 * | 10/2015 | Maruyama | H02H 9/04 |
| 2003/0039130 | A1 * | 2/2003 | Curtiss | G05F 1/613 363/37 |
| 2011/0156664 | A1 * | 6/2011 | Horihata | H02P 9/48 322/24 |
| 2011/0204856 | A1 * | 8/2011 | Horihata | H02P 9/30 322/27 |
| 2011/0215773 | A1 * | 9/2011 | Iwai | H02P 9/48 322/28 |
| 2012/0001598 | A1 * | 1/2012 | Horihata | H02P 9/006 322/21 |
| 2012/0007568 | A1 * | 1/2012 | Horihata | H02J 7/1461 322/21 |
| 2012/0068671 | A1 * | 3/2012 | Horihata | H02J 7/1492 322/94 |
| 2012/0074914 | A1 * | 3/2012 | Nakayama | H02M 7/53871 322/94 |
| 2012/0081083 | A1 * | 4/2012 | Horihata | H02P 9/48 322/99 |
| 2012/0086371 | A1 * | 4/2012 | Nakayama | H02P 27/08 318/400.06 |
| 2012/0091973 | A1 * | 4/2012 | Horihata | H02P 9/48 322/29 |
| 2012/0098503 | A1 * | 4/2012 | Horihata | H02P 9/08 322/23 |
| 2014/0042990 | A1 * | 2/2014 | Maruyama | H02P 9/102 322/28 |
| 2015/0311848 | A1 * | 10/2015 | Maruyama | H02K 1/26 318/490 |

* cited by examiner

VEHICLE-MOUNTED ELECTRIC ROTATING MACHINE

This application claims priority to Japanese Patent Application No. 2013-215260 filed on Oct. 16, 2013, the entire contents of which are hereby incorporated by reference.

BACKGROUND OF THE INVENTION

1. Field of the Invention

The present invention relates to a vehicle-mounted electric rotating machine for a vehicle such as a passenger car or a truck.

2. Description of Related Art

A vehicle-mounted generator is for supplying charging power to a battery of a vehicle through a charging cable connected to the output terminals thereof, the battery supplying operating power to various electrical loads mounted on the vehicle. If the charging cable comes off or comes loose from the output terminals of the generator or the battery terminals when the generator is generating power, there occurs an instantaneous high voltage called "load dump" at the output terminals of the generator. The high voltage can exceed 100 V depending on the output current of the generator. This high voltage may break or damage the electrical loads mounted on the vehicle or components of the generator. Accordingly, it is necessary to take countermeasures against the load dump. There is known a vehicle-mounted generator with a protection circuit against load dump. For example, refer to Japanese Patent Application Laid-open No. H09-219938. The vehicle-mounted generator described in this literature has the structure in which the low side elements of a bridge circuit of the generator are constituted of MOS transistors, and these MOS transistors are turned on when a load dump occurs and the output voltage of the generator exceeds a reference voltage. When the output voltage falls below the reference voltage after the turning on of the low side elements (MOS transistors), the MOS transistors are turned off so that the bridge circuit can resume its rectifying operation.

However, the vehicle-mounted generator as described in the above literature has a problem in that, since the operating voltage of the protection circuit is supplied from a battery charged by the generator, if the charging cable comes off the terminals of the battery causing a load dump, the protection circuit may become unstable. It is possible to generate the operating voltage of the protection circuit from the output voltage of the vehicle-mounted generator to cope with this problem. However, if the output voltage of the vehicle-mounted generator drops excessively for a long time as a result of the operation against the load dump, it becomes difficult for the protection circuit to operate normally. Since the vehicle-mounted generator has to repeat temporary power generating operation to prevent the output voltage from dropping more than necessary, it takes a long time for the output voltage to return to its normal value because it takes a long time for the energy accumulated in the stator winding due to the load dump to disappear.

SUMMARY

An exemplary embodiment provides a vehicle-mounted electric rotating machine including:

a field winding wound on a rotor for magnetizing a field pole of the rotor;

a stator winding for generating an AC voltage in accordance with a rotating magnetic field generated by the field pole;

a power converter for converting the AC voltage to a DC voltage and outputting the DC voltage through a first power supply line connected to an output terminal thereof; and a load dump handling section for performing a load dump protection operation when a voltage of the output terminal of the power converter exceeds a first threshold voltage, the load dump handling section being supplied with operating power through a second power supply line provided separately from the first power supply line.

According to the exemplary embodiment, there is provided a vehicle-mounted electric rotating machine capable of reliably performing a load dump protection operation, and returning the output voltage thereof to its normal value in a short time.

Other advantages and features of the invention will become apparent from the following description including the drawings and claims.

PREFERRED EMBODIMENTS OF THE INVENTION

First Embodiment

Figure 1:
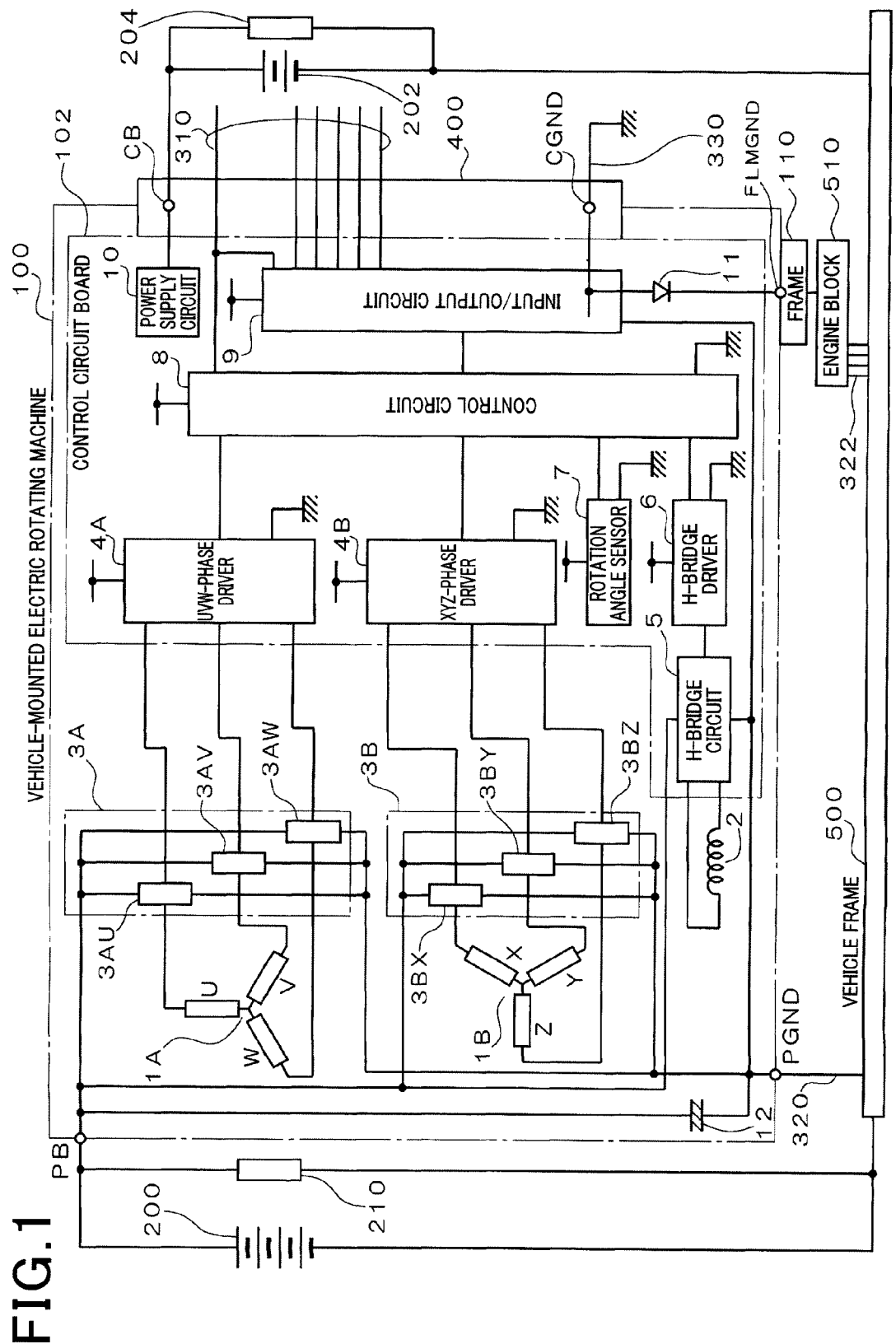
FIG. 1 is a diagram showing the structure of a vehicle-mounted generator as an embodiment of the invention.

FIG. 1 is a diagram showing the structure of a vehicle-mounted generator 100 as an embodiment of the invention. As shown in FIG. 1, the electric rotating machine 100 includes two stator windings 1A and 1B, a field winding 2, two MOS module groups 3A and 3B, a UVW-phase driver 4A, an XYZ-phase driver 4B, an H-bridge circuit 5, an H-bridge driver 6, a rotation angle sensor 7, a control circuit 8, an input/output circuit 9, a power supply circuit 10, a diode 11 and a capacitor 12. The electric rotating machine 100 is an ISG (Integrated Starter Generator) capable of operating as a motor in a motor mode and operating as a generator in a generator mode.

The stator winding 1A is a three-phase winding including a U-phase winding, a V-phase winding and a W-phase winding which are wound on a stator core (not shown). The stator winding 1B is a three-phase winding including an X-phase winding, a Y-phase winding and a Z-phase winding which are wound on the stator core at a position deviated by 30 degrees in electrical angle from the stator winding 1A. The stator windings 1A and 1B constitute a stator. The number of the phases of the stator windings 1A and 1B may be other than three.

The field winding 2, which is wound on a field pole (not shown) to form a rotor, causes the rotor to generate a magnetic field. The rotor includes a rotating shaft which transmits and receives drive power with a vehicle engine through a belt or a gear.

The MOS module group 3A is connected to the stator winding 1A so as to form a three-phase bridge circuit. The MOS module group 3A operates as a power converter which converts an AC voltage induced in the stator winding 1A to a DC voltage in the generator mode, and converts a DC voltage supplied from the outside (a high-voltage battery 200, in this embodiment) to an AC voltage to be applied to the stator winding 1A in the motor mode. The MOS module group 3A includes three MOS modules 3AU, 3AV and 3AW corresponding to the three phases of the stator winding 1A. The MOS module 3AU is connected to the U-phase winding of the stator winding 1A. The MOS module 3AV is connected to the V-phase winding of the stator winding 1A. The MOS module 3AW is connected to the W-phase winding of the stator winding 1A.

Figure 2:
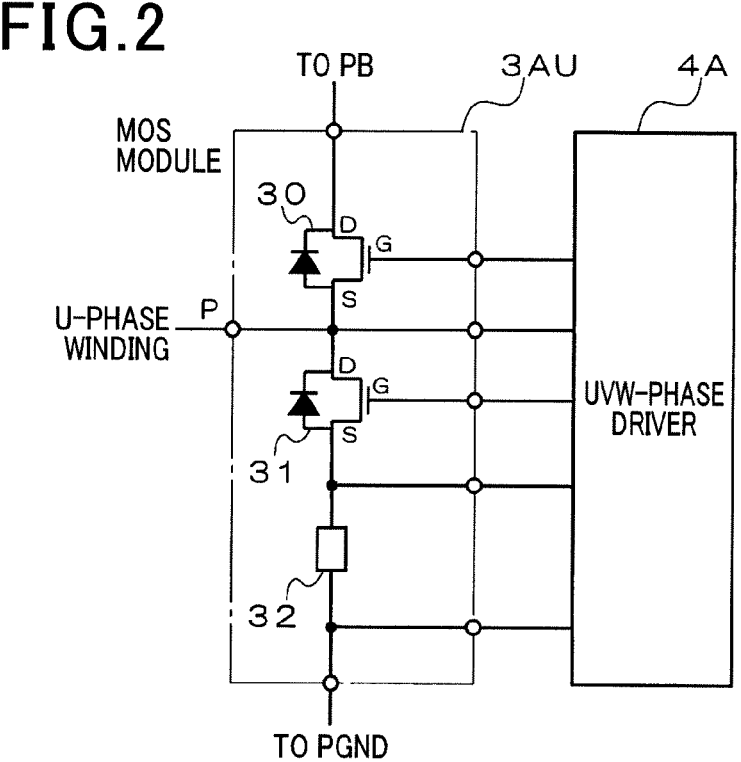
FIG. 2 is a diagram showing the structure of a MOS module mounted on a control circuit board included in the vehicle-mounted generator.

As shown in FIG. 2, the MOS module 3AU includes two MOS transistors 30 and 31, and a current detection resistor 32. The MOS transistor 30 is an upper arm (high side) switching element which is connected to the U-phase winding of stator winding 1A at its source and connected to a power supply terminal PB at its drain.

The power supply terminal PB is connected to the high voltage battery 200 whose rated output is 48 V, for example, and to the positive terminal of a high voltage load 210. The MOS transistor 31 is a lower arm (low side) switching element which is connected to the U-phase winding at its drain and to a power ground terminal PGND through the current detection resistor 32 at its source. A series circuit of the two resistors 30 and 31 is interposed between the positive and negative electrodes of the high voltage battery 200, the connection node of the two resistors 30 and 31 being connected to the U-phase winding through a P-terminal. The gate and source of the MOS transistor 30, the gate of the MOS transistor 31 and both ends of the current detection resistor 32 are connected to the UVW-phase driver 4A.

Each of the MOS transistors 30 and 31 is connected with a diode between the source and drain. The diode is parasitic diode (body diode) of the MOS transistor 30 or 31. A discrete diode may be parallel-connected to the parasitic diode. At least one of the upper arm and lower arm switching elements may be formed of other than a MOS transistor.

The MOS modules 3AV and 3AW, and later-explained MOS modules 3BX, 3BY and 3BZ have basically the same structure as the MOS module 3AU. Accordingly, detailed explanation of them is omitted.

The MOS module group 3B is connected to the stator winding 1B so as to form a three-phase bridge circuit. The MOS module group 3B operates as a power converter which converts an AC voltage induced in the stator winding 1B to a DC voltage in the generator mode, and converts the DC voltage supplied from the outside (the high voltage battery 200, in this embodiment) to an AC voltage to be applied to the stator winding 1B in the motor mode. The MOS module group 3B includes three MOS modules 3BX, 3BY and 3BZ corresponding to the three phases of the stator winding 1B. The MOS module 3BX is connected to the X-phase winding of the stator winding 1B. The MOS module 3BY is connected to the Y-phase winding of the stator winding 1B. The MOS module 3BZ is connected to the Z-phase winding of the stator winding 1B.

The UVW-phase driver 4A generates control signals to be applied to the MOS transistors 30 and 31 included in each of the three MOS module 3AU, 3AV and 3AW, and amplifies the voltage across both ends of the current detection resistor 32. The XYZ-phase driver 4B generates control signals to be applied to the MOS transistors 30 and 31 included in each of the three MOS module 3BX, 3BY and 3BZ, and amplifies the voltage across both ends of the current detection resistor 32. The MOS module group 3A and the UVW-phase driver 4A constitute a first inverter device. The MOS module group 3B and the XYZ-phase driver 4B constitute a second inverter device.

Figure 3:
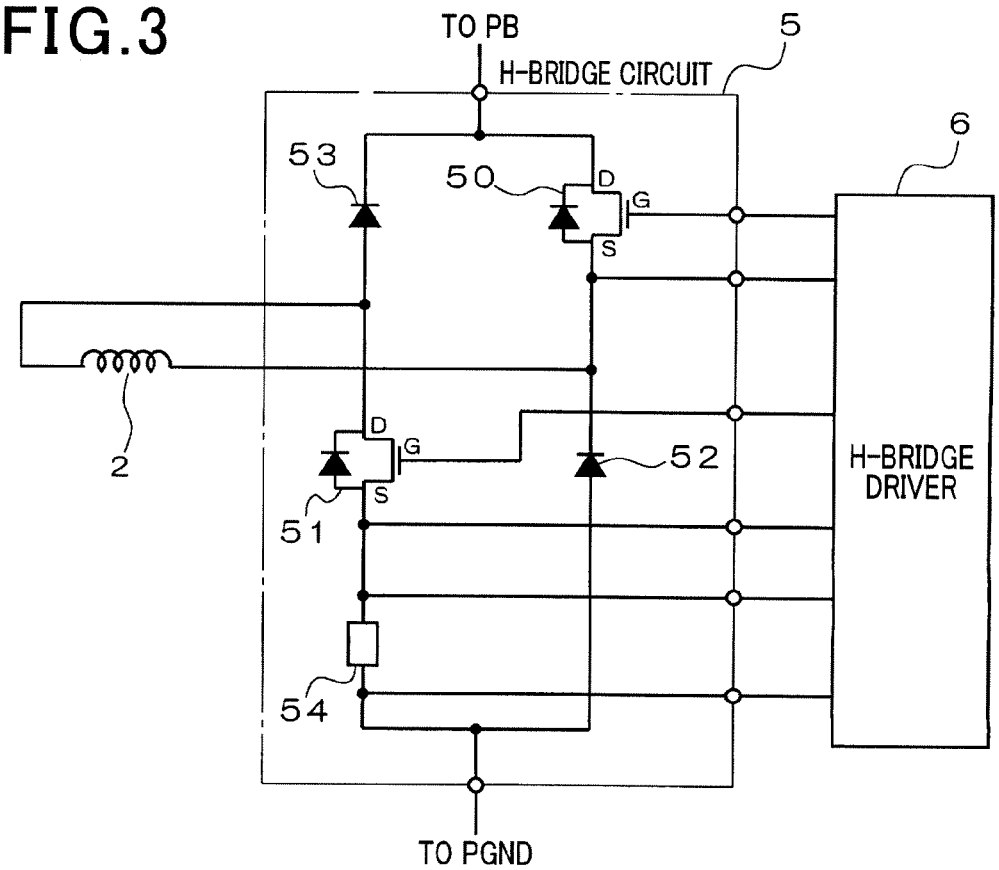
FIG. 3 is a diagram showing the structure of an H-bridge circuit mounted on the control circuit board included in the vehicle-mounted generator.

The H-bridge circuit 5 is an excitation circuit connected to both ends of the field winding 2 to supply an excitation current to the field winding 2. As shown in FIG. 3, the H-bridge circuit 5 includes two MOS transistors 50 and 51, two diodes 52 and 53 and a current detection resistor 54. The MOS transistor 50 on the high side and the diode 52 on the low side are connected to each other. The connection node therebetween is connected to one end of the field winding 2. The diode 53 on the high side, the MOS transistor 51 on the low side and the current detection resistor 54 are connected in series. The connection node between the diode 53 and the MOS transistor 51 is connected to the other end of the field winding 2. The H-bridge circuit 5 is connected to both the power supply terminal PB and the power ground terminal PGND. When the MOS transistors 50 and 51 are turned on, the excitation current is supplied to the field winding 2 from the H-bridge circuit 5. When one of the MOS transistors 50 and 51 is turned off, supply of the excitation current is stopped, and the excitation current can be circulated in the field winding 2 through the diode 52 or 53.

The H-bridge driver 6 generates drive signals to be applied to the gates of the MOS transistors 50 and 51 of the H-bridge circuit 5, and amplifies the voltage across both ends of the current detection resistor 54.

Figure 4:
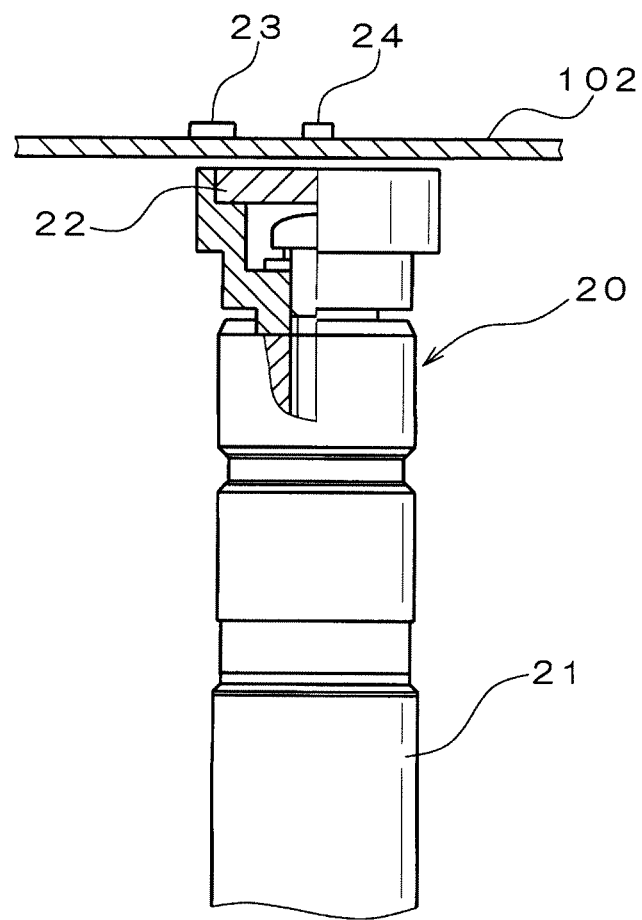
FIG. 4 is a diagram showing arrangement of a rotation angle sensor for use in the vehicle-mounted generator.

The rotation angle sensor 7 detects the rotation angle of the rotor. The rotation angle sensor 7 can be formed of a permanent magnet and Hall devices, for example. In this embodiment, as shown in FIG. 4, the rotation angle sensor 7 is formed of a permanent magnet 22 fixed at the tip of the rotating shaft 21 of the rotor 20, and Hall devices 23 and 24 which are disposed opposite the permanent magnet 22 and 90 degree apart from each other. The rotation angle of the rotor 20 can be determined based on the outputs of the Hall devices 23 and 24.

The control circuit 8 controls the whole of the electric rotating machine 100. The control circuit 8 includes A/D converters and D/A converters for signal exchange with external components. In this embodiment, the control circuit 8 is constituted of a microcomputer, and causes the electric rotating machine 100 to operate as a motor or a generator, and performs various operations including a load dump protection operation by executing control programs to control the UVW driver 4A, the XYZ driver 4B and the H-bridge driver 6.

The input/output circuit 9 is for exchanging signals with the outside through a control harness 310, and converting the levels of the terminal voltage of the high voltage battery 200 and the voltage of the power grand terminal PGND. The input/output circuit 9, which is an input/output interface for handling signals or voltages inputted thereto or outputted therefrom, can be formed a custom IC, for example.

The power supply circuit 10 is connected with a low voltage battery 202 (a second battery) of rated output of 12 V, and generates an operating voltage of 5 V by smoothing the output of a switching element which is turned on and off periodically using a capacitor, for example. The UVW-phase driver 4A, the XYZ-phase driver 4B, the H-bridge driver 6, the rotation angle sensor 7, the control circuit 8 and the input/output circuit 9 operate on this operating drive.

The capacitor 12 is for removing or reducing switching noise occurring when the MOS transistors 30 and 31 are turned on and off in the motor mode. FIG. 1 shows that a single capacitor 12 is used. However, two or more capacitors may be used depending on the level of the switching noise.

The UVW-phase driver 4A, the XYZ-phase driver 4B, the H-bridge circuit 5, the H-bridge driver 6, the rotation angle sensor 7 (excluding the permanent magnet fixed to the rotor), the control circuit 8, the input/output circuit 9 and the power supply circuit 10 are mounted on a control circuit board 102.

As shown in FIG. 1, the electric rotating machine 100 is provided with a connector 400 to which the power supply terminal PB, the power ground terminal PGND, a control power terminal CB and the control harness 310 are fitted. The power supply terminal PB, which is a high-voltage positive input/output terminal, is connected with the high voltage battery 200 and the high voltage load 210 through a cable (a first power supply line). The control power terminal CB, which is a low-voltage positive input/output terminal, is connected with the low voltage battery 202 and a low voltage load 204 through a cable (a second power supply line).

The power grand terminal PGND as a first ground terminal is for grounding the power system circuitry. The power grand terminal PGND is connected to a vehicle frame 500 through a grounding harness 320 as a first grounding line. The power system circuitry is constituted of the MOS module groups (power converters) 3A and 3B and the H-bridge circuit (excitation circuit) 5. The power system circuitry includes the MOS transistors 30, 31, 50 and 51 as power elements of the stator windings 1A and 1B, and the field winding 2.

The control ground terminal CGND, which is provided as a second ground terminal separately from the power grand terminal PGND, is for grounding the control system circuitry. The control ground terminal CGND is grounded through a grounding cable 330 (second grounding line) provided separately from the grounding harness 320. The diode 11 is interposed between the control grand terminal CGND and a frame (referred to as the "ISG frame" hereinafter) 110 of the electric rotating machine 100 through an internal wire of the input/output circuit 9. Specifically, the cathode of the diode 11 is connected to a frame ground terminal FLMGND which is connected to the ISG frame 110. The control system circuitry is constituted of the UVW-phase driver 4A, the XYZ-phase driver 4B, the H-bridge driver 6, the rotation angle sensor 7, the control circuit 8, the input/output circuit 9, cut-off switches 13A and 13B and so on. The grounding cable 330 is connected to a part at ground potential (0 V) of the vehicle. In FIG. 1, the diode 11 is shown to be disposed outside the input/output circuit 9. However, the diode 11 may be disposed inside the input/output circuit 9.

The connector 400 is for fitting the control harness 310, the grounding cable 330 and other cables to the various terminals (the control ground terminal CGND, the control power terminal CB, for example) other than the power supply terminal PB and the power ground terminal PGND.

The ISG frame 110 of the electric rotating machine 100 is a conductor made of die-cast aluminum, for example. The ISG frame 110 is fixed to an engine block 510 by volts. The engine block 510 is connected to the vehicle frame 500 by a grounding harness 322.

Next, the load dump protection operation performed by the electric rotating machine 100 having the structure described above is explained. The protection operation is performed in a case where at least one of the cables connected to the power supply terminal PB or the high voltage load 210 comes off or comes loose from the power supply terminal PB, the terminal of the high voltage battery 200 or the terminal of the high voltage load 210, as a result of which a load dump is caused in which the voltage of the power supply terminal PB exceeds a threshold voltage (a first threshold voltage).

Figure 5:
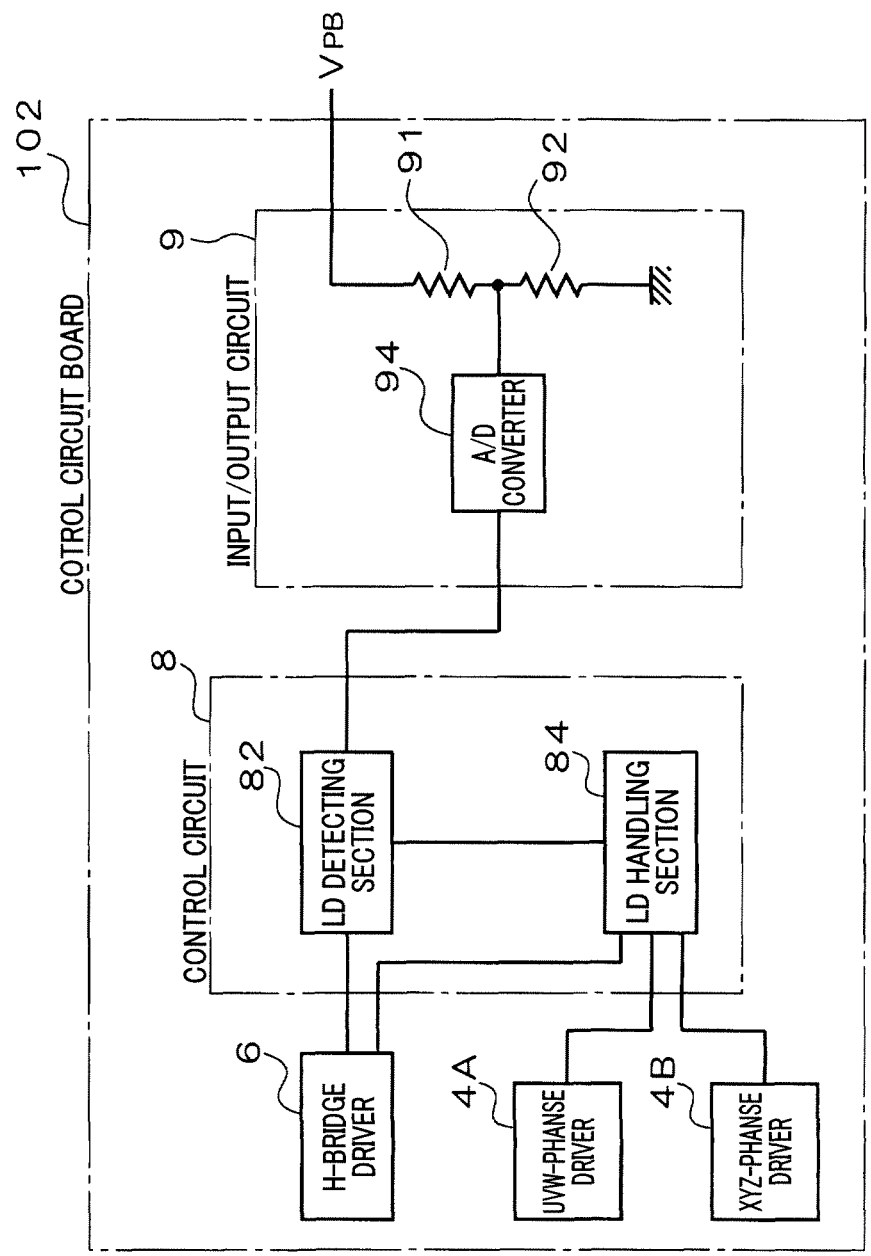
FIG. 5 is a diagram showing a structure for performing load dump protection mounted on the control circuit board included in the vehicle-mounted generator.

As shown in FIG. 5, the input/output circuit 9 of the electric rotating machine 100 includes resistors 91 and 92, and an A/D converter 94 which are dedicated to perform the load dump protection operation. Further, the control circuit 8 includes an LD (load dump) detecting section 82 and an LD handling section 84. The LD detecting section 82 and the LD handling section 84 constitute a load dump coping section.

The resistors 91 and 92 form a dividing circuit for dividing the voltage $V_{PB}$ of the power supply terminal PB (the voltage of the output terminal of the power converter) to generate the divided voltage $V_{PB}'$. The A/D converter 94 converts the divided voltage $V_{PB}'$ to digital output voltage data. The A/D converter 94 may be included in the control circuit 8 instead of the input/output circuit 9.

The LD detecting section 82 detects start and end of a load dump. Specifically, the LD detecting section 82 determines, based on the output voltage data received from the A/D converter 94, that a load dump has occurred if the voltage $V_{PB}$ of the power supply terminal PB exceeds the first threshold voltage V1, and determines that the load dump has ended when a predetermined LD end condition (explained later) has been satisfied.

The LD handling section 84 performs the load dump protection operation to reduce the voltage $V_{PB}$ of the power supply terminal PB below the first threshold voltage V1. This protection operation is performed until the LD end condition is satisfied. In this embodiment that uses the high voltage battery 200 of rated output of 48 V, the load dump protection operation is performed such that the voltage $V_{PB}$ of the power supply terminal PB can be prevented from exceeding 60 V by setting the first threshold voltage V1 to 58 V, for example.

Example 1 of the Load Dump Protection Operation:

The LD handling section 84 sends a command to the H-bridge driver 6 to stop supply of the excitation current to the field winding 2, and also sends a command to the UVW-phase driver 4A and XYZ-phase driver 4B to turn on all the lower arm (low side) MOS transistors 31 included in the MOS module groups 3A and 3B. At this time, all the upper arm (high side) MOS transistors 30 are turned off. By controlling the MOS transistors 30 and 31 in this way, the currents flowing through the phase windings of the stator windings 1A and 1B can be circulated through the MOS transistors 31. As a result, the voltage $V_{PB}$ of the power supply terminal PB can be reduced rapidly.

In the way described above, the lower arm MOS transistors 31 are turned on and the upper arm MOS transistors 30 are turned off. However, the load dump protection operation may be performed by turning on the upper arm MOS transistors 30 and turning off the lower arm MOS transistors 31.

Example 2 of the Load Dump Protection Operation:

The LD handling section 84 sends a command to the H-bridge driver 6 to stop supply of the excitation current to the field winding 2, and also sends a command to the UVW-phase driver 4A and XYZ-phase driver 4B to set the q-axis currents respectively flowing through the stator windings 1A and 1B to zero, and set the d-axis currents respectively flowing through the stator windings 1A and 1B to a predetermined value other than zero for reducing the power generation torque and increasing the reactive currents. For this example 2 of the load dump protection operation, the control circuit board of the electric rotating machine 100 has the structure shown in FIGS. 6 and 7.

Figure 6:
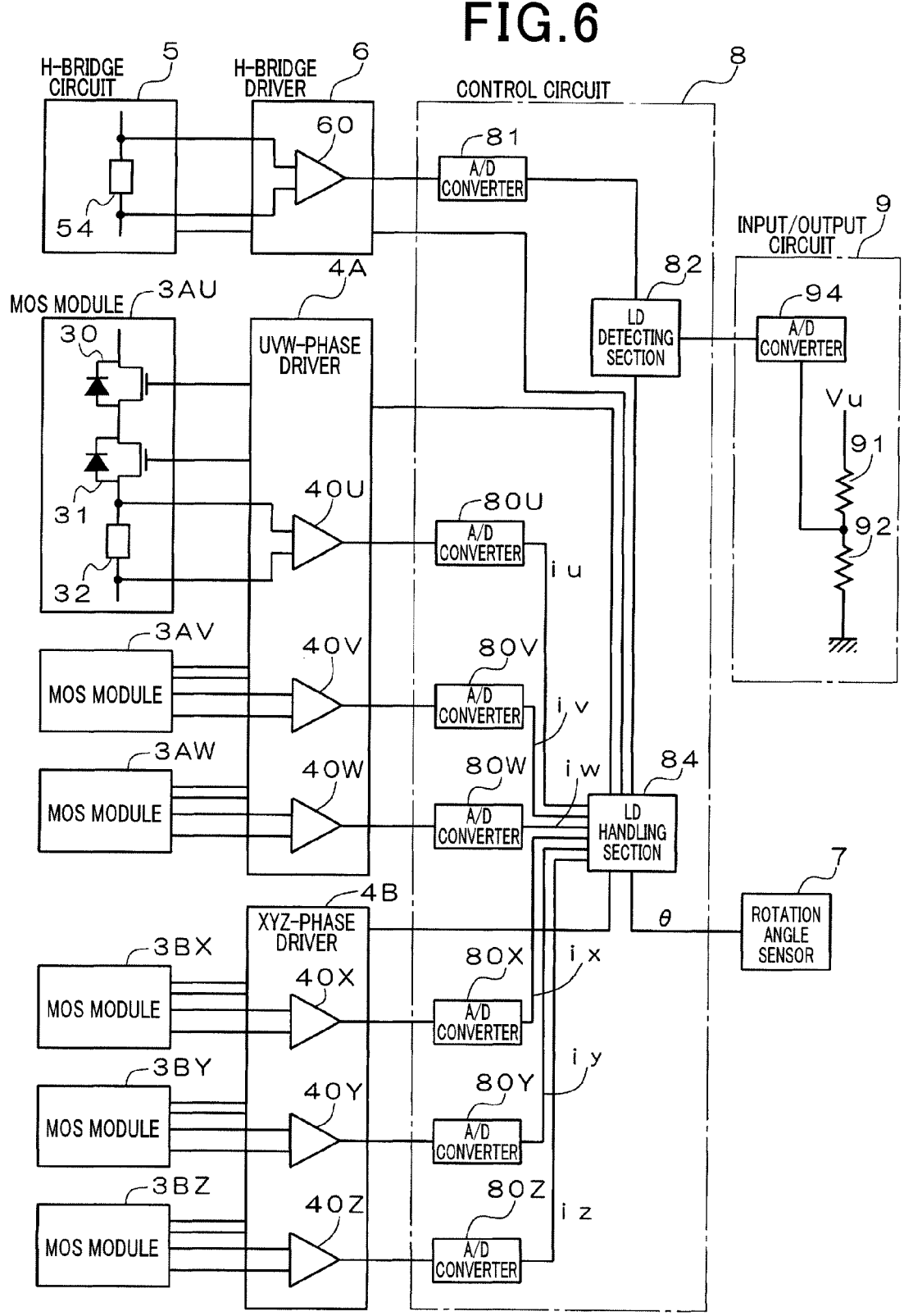
FIG. 6 is a diagram showing the circuit structure of a control circuit mounted on the control circuit board included in the vehicle-mounted generator.

As shown in FIG. 6, in this structure, the UVW-phase driver 4A includes three amplifiers 40U, 40V and 40W for amplifying the voltages across the current detecting resistors 32 of the MOS module 3AU, 3AV and 3AW, respectively. Likewise, the XYZ-phase driver 4B includes three amplifiers 40X, 40Y and 40Z for amplifying the voltages across the current detecting resistors 32 of the MOS module 3BX, 3BY and 3BZ, respectively. The H-bridge driver 6 includes an amplifier 60 for amplifying the voltage across the current detecting resistor 54 of the H-bridge circuit 5.

As shown in FIG. 6, the control circuit 8 includes the LD detecting section 82, the LD handling section 84 and seven A/D converters 80U, 80V, 80W, 80X, 80Y, 80Z and 81. Each of these seven A/D converters corresponds to one of the amplifiers of the UVW-phase driver 4A, the XYZ-phase driver 4B and the H-bridge driver 6, and converts the output voltage of the corresponding amplifier to digital data (phase current data or excitation current data).

Figure 7:
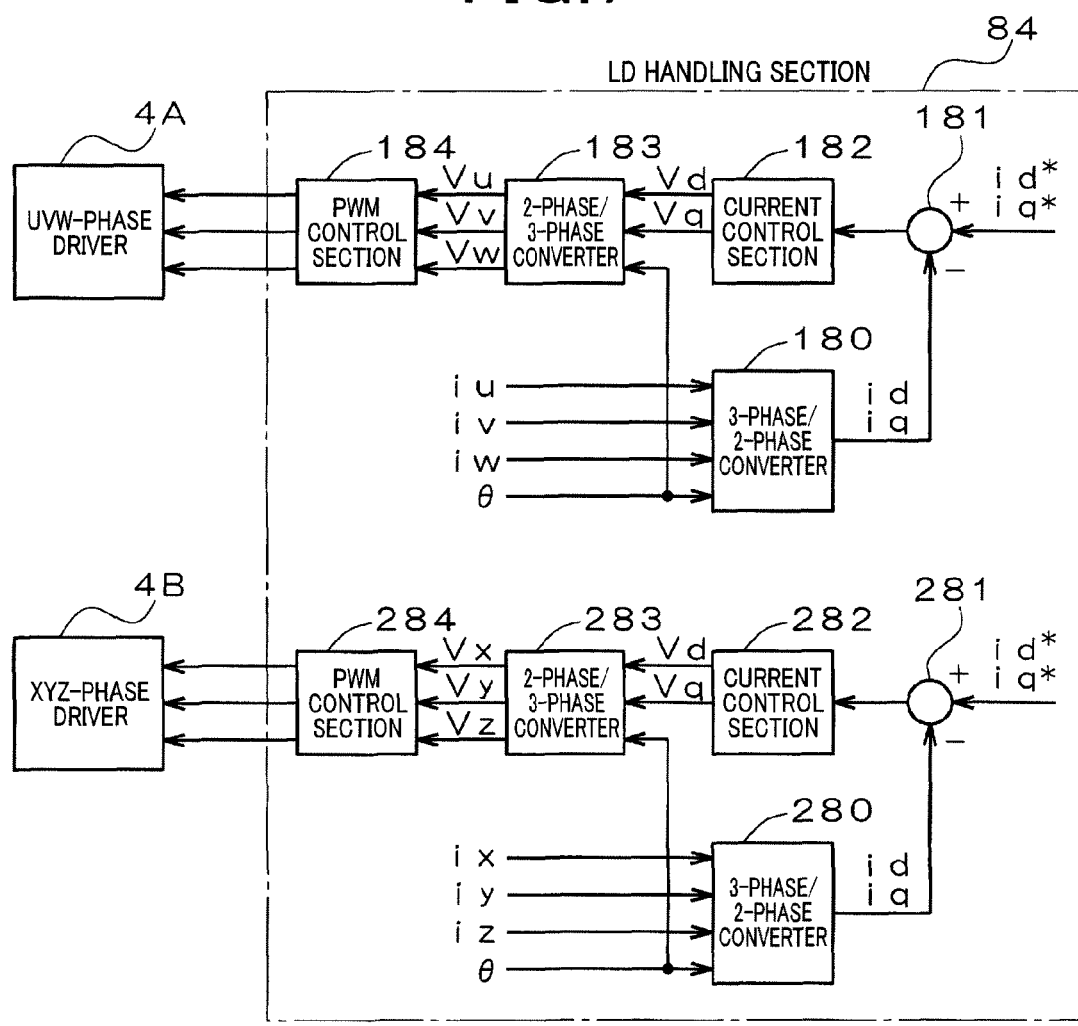
FIG. 7 is a diagram showing the structure of an LD handling section of the control circuit.

As shown in FIG. 7, the LD handling section 84 includes a three-phase/two-phase converter 180 corresponding to the UVW-phase driver 4A, an adder 181, a current control section 182, a two-phase/three-phase converter 183, a PWM control section 184, a three-phase/two-phase converter 280 corresponding to the XYZ-phase driver 4B, an adder 281, a current control section 282, a two-phase/three-phase converter 283 and a PWM control section 284. The structure corresponding to the UVW-phase driver 4A is the same as the structure corresponding to the XYZ-phase driver 4B. Accordingly, in the following, only the structure for the UVW-phase driver 4A is explained.

The three-phase/two-phase converter 180 continuously receives the phase-current data iu, iv and iw outputted from the A/D converters 80U, 80V and 80W, and the rotational angle data θ outputted from the rotational angle sensor 7. The three-phase/two-phase converter 180 calculates d-axis data id and q-axis data iq based on these received data.

The adder 181 calculates the difference between a command value id* for the d-axis current and the calculated d-axis data id as d-axis difference data Δid (Δid=id*−id), and the difference between a command value q* for the q-axis current and the calculated q-axis data iq as q-axis difference data Δiq (Δiq=iq*−iq). The command value iq* for the q-axis current relevant to the drive torque is set to zero, and the command value id* for the d-axis current relevant to the reactive power is set to a predetermined value other than zero which may be a fixed value or determined in accordance with the voltage $V_{PB}$ and the resistance of the stator winding 1A. FIG. 7 shows that both the d-axis difference data Δid and the q-axis difference data Δiq are calculated by the single adder 181. However, actually, the d-axis difference data Δid and the q-axis difference data Δiq are calculated by two separate adders.

The current control section 182 converts the d-axis difference data Δid and the q-axis difference data Δiq to d-axis voltage data Vd and q-axis voltage data, respectively, by performing PI control or the like. The two-phase/three-phase converter 183 continuously receives the voltage data Vd and Vq from the current control section 182 and the rotation angle data θ from the rotation angle sensor 7, and generates phase voltages Vu, Vv and Vw corresponding to these voltage data Vd and Vq. The PWM control section 184 generates PWM signals necessary to generate the phase voltages Vu, Vv and Vw in the three phase windings. The PWM signals are supplied to the UVW-phase driver 4A. The UVW-phase driver 4A drives the MOS transistors 30 and 31 included in each of the MOS module 3AU, 3AV and 3AW in accordance with the PWM signals.

By performing the load dump protection operation in the way described above, it is possible to dissipate energy accumulated in the stator windings 1A and 1B and the capacitor 12 due to a load dump by reducing the drive torque (power generation torque) and increasing the reactive currents.

Next, examples of determination of an end of a load dump is explained.

Figure 8:
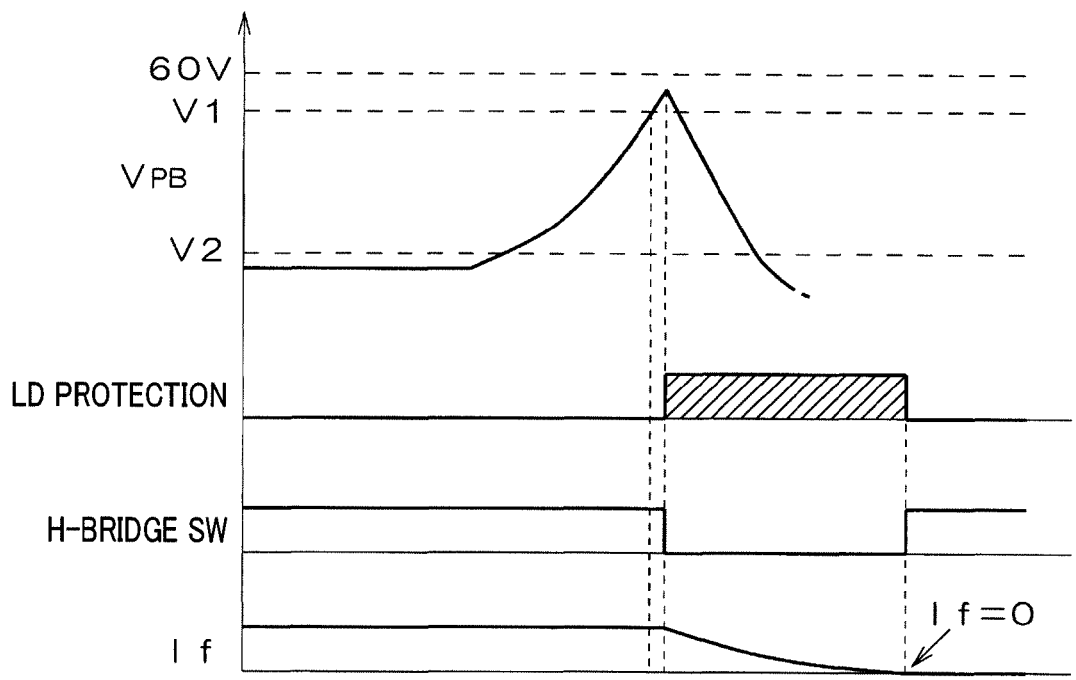
FIG. 8 is a time chart for explaining an example of determining an end of a load dump.
Figure 9:
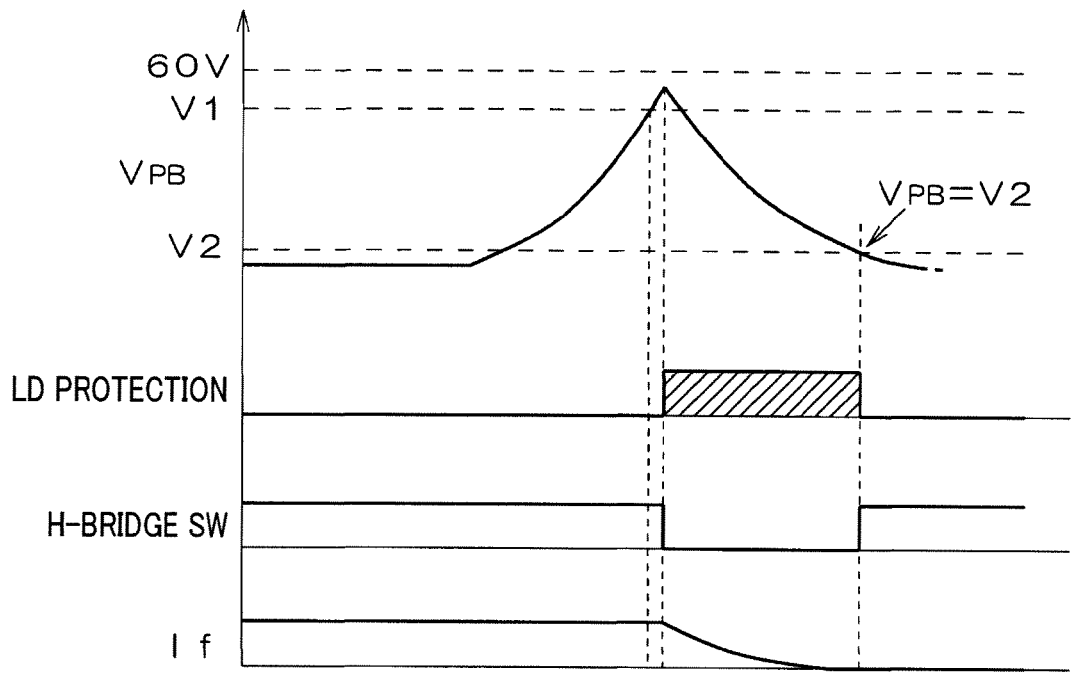
FIG. 9 is a time chart for explaining another example of determining an end of a load dump.

Example 1 of Determination of an End of a Load Dump:

As shown in FIG. 8, a determination that a load dump has ended is made at the moment when the value of the field current circulating through the field winding 2 becomes zero (or below a predetermined value) after stop of supply of the field current to the field winding 2. In FIG. 9 (also in FIG. 8), "$V_{PB}$" indicates temporal variation of the voltage of the power supply terminal PB, and "LD PROTECTION" indicates the state of the load dump protection operation (hatched area showing a period in which the load dump protection operation is in operation). Further, "H-BRIDGE SW" indicates the state of supply of the field current from the H-bridge circuit 5 (the high level area showing a period in which the field current is being supplied, the low level area showing a period in which the supply is stopped). Incidentally, since it is necessary to measure the current circulating through the field winding even after stop of supply of the field current to the field winding 2, stopping of the supply of the field current is performed by turning off the MOS transistor 50 and turning on the MOS transistor 51 within the H-bridge circuit 5. In FIG. 9, "If" indicates temporal variation of the field current flowing through the field winding 2.

Example 2 of Determination of an End of a Load Dump:

As shown in FIG. 9, a determination that a load dump has ended is made at the moment when the voltage $V_{PB}$ of the power supply terminal PB decreases below a second threshold voltage V2 after stop of supply of the field current to the field winding 2. When the rated output of the high voltage battery 200 is 48 V, the second threshold voltage V2 is set to 52 V, for example. The value of 52 V of the second threshold voltage V2 is the power generation voltage in the normal state. However, the second threshold voltage V2 may be set higher than or lower than the normal power generation voltage. A determination of an end of a load dump may be made at the moment when both the above conditions in example 1 and example 2 are satisfied.

As explained above, according to the electric rotating machine 100 of this embodiment, even if the output terminal (power supply terminal PB) or the electric load 2 is electrically disconnected from the first power supply line causing a load sump, the load dump protection operation can be performed reliably because the components for performing the load dump protection operation including the LD detecting section 82 and the LD handling section 84 are supplied with power through the second power supply line. Further, since it is not necessary to perform the power generating operation periodically to prevent the voltage of the output terminal from dropping excessively, the energy accumulated in the stator windings 1A and 1B can be dissipated rapidly and accordingly the time necessary for the voltage of the output terminal to return to its normal value can be shortened.

The LD detecting section 82 and the LD handling section 84 are supplied with power from the power supply circuit 10 connected to the low voltage battery 202. Accordingly, the power necessary to perform the load dump protection operation can be obtained reliably.

The LD handling section 84 performs the load dump protection operation by reducing the power generation torque and increasing the reactive currents. Specifically, the LD handling section 84 performs the load dump protection operation by controlling the q-axis current to zero and controlling the d-axis current to a predetermined value other than zero for each of the stator windings 1A and 1B. This makes it possible to reduce the output voltage rapidly without placing a large load on the engine.

Alternatively, the LD handling section 84 performs the load dump protection operation by turning on all the upper arm MOS transistors 30 (or lower arm MOS transistors 31) included in the MOS module groups 3A and 3B. This makes it possible to reduce the output voltage due to a load dump by simple control.

The LD detecting section 82 determines that a load dump has ended at the moment when the voltage $V_{PB}$ (output voltage) of the power supply terminal PB decreases below the second threshold voltage V2 lower than the first threshold voltage V1. Accordingly, by monitoring the voltage of the output terminal, an end of a load dump can be easily determined.

Alternatively, the LD detecting section 82 determines that a load dump has ended at the moment when the current actually flowing through the field winding 2 after stop of supply of the field current to the field winding 2 decreases below zero or a predetermined value. By monitoring the current flowing through the field winding 2, it is possible to determine that the energy accumulated in the stator windings 1A and 1B due to a load dump has disappeared and the load dump has ended.

It is a matter of course that various modifications can be made to the above described embodiment. For example, the electric rotating machine 100 of the above embodiment includes two stator windings 1A and 1B, and two MOS module groups 3A and 3B. However, the present invention can be applied to a vehicle-mounted electric rotating machine including one or three or more stator windings, and including one or three or more MOS module groups.

The above explained preferred embodiments are exemplary of the invention of the present application which is described solely by the claims appended below. It should be understood that modifications of the preferred embodiments may be made as would occur to one of skill in the art.

What is claimed is:

1. A vehicle-mounted electric rotating machine comprising:
    a field winding wound on a rotor for magnetizing a field pole of the rotor;
    a stator winding for generating an AC voltage in accordance with a rotating magnetic field generated by the field pole;
    a power converter for converting the AC voltage to a DC voltage and outputting the DC voltage through a first power supply line connected to an output terminal thereof; and
    a load dump handling section for performing a load dump protection operation when a voltage of the output terminal of the power converter exceeds a first threshold voltage, the load dump handling section being supplied with operating power through a second power supply line provided separately from the first power supply line.

2. The vehicle-mounted electric rotating machine according to claim 1, further comprising a power supply circuit for supplying the operating power to the load dump handling section,
    the output terminal of the power converter being connected to a first battery through the first power supply line,
    the power supply circuit being connected to a second battery provided separately from the first battery through the second power supply line.

3. The vehicle-mounted electric rotating machine according to claim 1, wherein the load dump handling section performs the load dump protection operation by reducing a power generation torque of the vehicle-mounted electric rotating machine, and increasing a reactive current flowing through the stator winding.

4. The vehicle-mounted electric rotating machine according to claim 1, wherein the load dump handling section performs the load dump protection operation by controlling a q-axis current flowing through the stator winding to zero, and controlling a d-axis current flowing through the stator winding to a predetermined value other than zero.

5. The vehicle-mounted electric rotating machine according to claim 1, wherein the power converter includes a bridge circuit having an upper arm and a lower arm connected in series for each of phase windings of the stator winding, at least one of the upper arm and lower arm being formed of a switching element, the load dump handling section performing the load dump protection operation by turning on the switching elements of all the upper arms or lower arms.

6. The vehicle-mounted electric rotating machine according to claim 1, wherein the load dump handling section terminates the load dump protection operation at a moment when the voltage of the output terminal of the power converter decreases below a second threshold voltage lower than the first threshold voltage.

7. The vehicle-mounted electric rotating machine according to claim 1, wherein the load dump handling section stops supply of a field current to the field winding while the load dump protection operation is performed, and terminates the load dump protection operation at a moment when a current actually flowing through the field winding becomes zero or a predetermined value.

\* \* \* \* \*